(12) United States Patent
Umemoto et al.

(10) Patent No.: US 11,168,022 B2
(45) Date of Patent: Nov. 9, 2021

(54) GLASS CERAMICS SINTERED BODY AND COIL ELECTRONIC COMPONENT

(71) Applicant: TDK CORPORATION, Tokyo (JP)

(72) Inventors: Shusaku Umemoto, Tokyo (JP); Takashi Suzuki, Tokyo (JP); Hidekazu Sato, Tokyo (JP); Masaki Takahashi, Tokyo (JP); Shinichi Kondo, Tokyo (JP)

(73) Assignee: TDK CORPORATION, Tokyo (JP)

( * ) Notice: Subject to any disclaimer, the term of this patent is extended or adjusted under 35 U.S.C. 154(b) by 447 days.

(21) Appl. No.: 16/181,715

(22) Filed: Nov. 6, 2018

(65) Prior Publication Data

US 2019/0194063 A1    Jun. 27, 2019

(30) Foreign Application Priority Data

Dec. 27, 2017 (JP) .............................. JP2017-252210

(51) Int. Cl.
| | |
|---|---|
| *C03C 10/00* | (2006.01) |
| *C03C 4/16* | (2006.01) |
| *H01F 27/32* | (2006.01) |
| *H01F 41/02* | (2006.01) |
| *H01F 27/28* | (2006.01) |

(Continued)

(52) U.S. Cl.
CPC ............ *C03C 10/0036* (2013.01); *C03C 4/16* (2013.01); *C03C 10/0018* (2013.01); *C03C 10/0045* (2013.01); *C03C 10/0054* (2013.01); *H01F 17/0006* (2013.01); *H01F 17/0013* (2013.01); *H01F 27/2804* (2013.01); *H01F 27/292* (2013.01); *H01F 27/32* (2013.01); *H01F 27/323* (2013.01); *H01F 41/02* (2013.01); *H01F 41/041* (2013.01); *H01F 41/127* (2013.01);
(Continued)

(58) Field of Classification Search
CPC ... C03C 10/0036; C03C 4/16; C03C 10/0018; C03C 10/0045; C03C 10/0054; C03C 2204/00; C03C 2214/16; H01F 17/0006; H01F 17/0013; H01F 27/2804; H01F 27/292; H01F 27/32; H01F 27/323; H01F 41/02; H01F 41/041; H01F 41/127; H01F 2027/2809
See application file for complete search history.

(56) References Cited

U.S. PATENT DOCUMENTS 6,329,715 B1 *  12/2001  Hayashi .................. H01L 23/15
                                                                257/528
2014/0145816 A1   5/2014  Sato et al.
(Continued)

FOREIGN PATENT DOCUMENTS

| CN | 103733361 A | 4/2014 |
|---|---|---|
| CN | 103827991 A | 5/2014 |

(Continued)

*Primary Examiner* — Karl E Group
*Assistant Examiner* — Cameron K Miller
(74) *Attorney, Agent, or Firm* — Oliff PLC

(57) ABSTRACT

A glass ceramics sintered body includes a glass phase and a ceramics phase dispersed in the glass phase. The ceramics phase includes alumina grains and zirconia grains. The glass phase includes an $MO$—$Al_2O_3$—$SiO_2$—$B_2O_3$ based glass, where M is an alkaline earth metal. An area ratio of the alumina grains is 13 to 30%, and an area ratio of the zirconia grains is 0.05 to 6%, on a cross section of the sintered body.

8 Claims, 3 Drawing Sheets

(51) Int. Cl.
  *H01F 41/04*  (2006.01)
  *H01F 27/29*  (2006.01)
  *H01F 17/00*  (2006.01)
  *H01F 41/12*  (2006.01)

(52) U.S. Cl.
  CPC ...... *C03C 2204/00* (2013.01); *C03C 2214/16* (2013.01); *H01F 2027/2809* (2013.01)

(56) References Cited

U.S. PATENT DOCUMENTS

| | | |
|---|---|---|
| 2014/0153262 A1 | 6/2014 | Ohta et al. |
| 2015/0010721 A1* | 1/2015 | Tanida .................... C03C 3/091 428/34.5 |
| 2016/0229738 A1 | 8/2016 | Umemoto et al. |
| 2017/0345543 A1* | 11/2017 | Soda ....................... C03C 3/089 |
| 2017/0365386 A1* | 12/2017 | Arai ....................... H01F 27/255 |
| 2018/0230040 A1 | 8/2018 | Umemoto et al. |
| 2018/0330855 A1 | 11/2018 | Sato et al. |

FOREIGN PATENT DOCUMENTS

| | | |
|---|---|---|
| CN | 108424000 A | 8/2018 |
| JP | 2007-015878 A | 1/2007 |
| JP | 2016-155746 A | 9/2016 |
| WO | 2013/133300 A1 | 9/2013 |

\* cited by examiner

GLASS CERAMICS SINTERED BODY AND COIL ELECTRONIC COMPONENT

BACKGROUND OF THE INVENTION

The present invention relates to a glass ceramics sintered body having a low dielectric constant and a sufficient strength, particularly favorably used as a coil material, and capable of being manufactured by sintering at a low temperature, and to a coil electronic component using the glass ceramics sintered body.

In accordance with increase in the frequency of communication devices such as cellular phones, many ceramic coils applicable for high frequencies are now adopted in these transmission units and reception units. Among these ceramic coils, high frequency inductors used particularly for smart phones or so are required to be miniaturized, to be applicable for high frequencies, and to have a high Q value. When the stray capacitance of the inductor is large, the self-resonance frequency is lowered, and the function as the inductor may remarkably deteriorate in the high-frequency region. For application of an Ag based conductor having low resistance and low loss to the internal electrode, sinterability at a low-temperature may be required.

As a material of the ceramic coil, a glass based material having a low dielectric constant is thereby normally used. $SiO_2$, which has a dielectric constant "ε" of approximately 3.8, is normally known as a glass based material having a low dielectric constant. Since $SiO_2$ is not sintered at 960° C. or lower, however, using $SiO_2$ is restricted when an Ag based conductor having a melting point of approximately 960° C. is used as an internal electrode. Thus, a coil material capable of being sintered at a low temperature is desired.

As a glass based material having a low dielectric constant and being promising for low temperature sintering, a glass based material composed of borosilicate glass (ε: 3.8) was investigated to be used. This material can be sintered at 900° C. or less and is considered to be promising for low temperature sintering. When this material is used as a base body of coil electronic components such as a ceramic coil, however, a strength that is lower than one originally expected is only exhibited as scratches or so formed on the surface of the base body causes cracks.

To improve the strength of the glass based material, a glass ceramics in which a filler is added to a glass based material is thereby studied. $Al_2O_3$ (alumina) is widely used as the filler. The filler needs to have affinity with a glass phase and wettability. From this point of view, alumina is one of promising filler materials.

When the filler is added, however, the surface roughness of the internal electrode in contact with the glass phase is increased. Since the conduction of the internal electrode is dominated by a surface conduction, an undesirable increase in surface roughness leads to an increase in resistance. The surface state of the internal electrode significantly influences the Q value particularly in a multilayer chip inductor in which miniaturization and thinning are progressing. The dielectric constant "ε" of alumina is approximately 10, and the addition of the filler inevitably increases the dielectric constant.

As a low-temperature sinterable glass ceramic composition, Patent Document 1 (JP2007-15878A) discloses the following ceramic composition aiming to improve acid resistance:

A ceramic composition comprising 40 to 80 wt % of borosilicate glass powder and 60 to 20 wt % of ceramic powder, wherein the borosilicate glass powder contains 28 to 50 wt % of $SiO_2$, 36 to 55 wt % of MO (MO is at least one of CaO and MgO), 0 to 20 wt % of $Al_2O_3$, and 5 to 17.5 wt % of $B_2O_3$, and the ceramic powder contains 1 wt % or more of $ZrO_2$.

Patent Document 1 also discloses that the ceramic powder may contain $Al_2O_3$ in addition to $ZrO_2$. The ceramic composition disclosed specifically in this document contains a large amount of $ZrO_2$ or a large amount of $\alpha\text{-}Al_2O_3$. This document also discloses a glass ceramics composition containing $ZrO_2$ and $\alpha\text{-}Al_2O_3$ as the ceramic powder (filler), but all specific examples contain a large amount of $ZrO_2$ or a large amount of $\alpha\text{-}Al_2O_3$.

The ceramic composition of Patent Document 1 aims for improvement in acid resistance and contains a relatively large amount of $ZrO_2$, which is effective for improvement in acid resistance. $ZrO_2$ is effective for improvement in strength and acid resistance, but increases the dielectric constant. $Al_2O_3$ also increases the dielectric constant of the glass based material. This document does not disclose the dielectric constant of the ceramic composition, but the ceramic composition of Patent Document 1 contains a relatively large amount of $ZrO_2$ filler and/or $Al_2O_3$ filler and is thereby presumed to have a high dielectric constant. Thus, the ceramic composition of Patent Document 1 is unfavorable for use in a high frequency region.

Accordingly, the addition of filler is promising from a viewpoint of improvement in strength of a coil element, but the amount of filler is desired to be controlled within an appropriate range from a viewpoint of electronic characteristics. For improvement in dielectric constant, strength, and sinterability in a balanced manner, it is thereby desired to develop a ceramic composition that can contribute to improvement in strength without excessively raising dielectric constant and does not excessively raise sintering temperature by optimizing a mixing amount of zirconia and a mixing amount of alumina.

Patent Document 1: JP 2007-15878A

BRIEF SUMMARY OF INVENTION

The present invention has been made considering such circumstances, and an object of the present invention is to provide a glass ceramics sintered body capable of being sintered at a low temperature and having a low dielectric constant and a sufficient strength, and to provide a coil electronic component using the glass ceramics sintered body.

As a result of intensive research, the present inventors have found that when specific amounts of alumina and zirconia as fillers (a ceramics phase) are contained in a glass phase having a specific composition, strength can be improved by sintering at a relatively low temperature without excessively increasing the dielectric constant. Then, the present invention has been achieved.

Namely, the summary of the present invention is as follows:

(1) A glass ceramics sintered body comprising a glass phase and a ceramics phase dispersed in the glass phase, wherein the ceramics phase comprises alumina grains and zirconia grains, the glass phase comprises an $MO\text{—}Al_2O_3\text{—}SiO_2\text{—}B_2O_3$ based glass, where M is an alkaline earth metal, and an area ratio of the alumina grains is 13 to 30% and an area ratio of the zirconia grains is 0.05 to 6% on a cross section of the sintered body.

(2) The glass ceramics sintered body according to (1), wherein
   95% or more of the alumina grains are in a range of 0.05 to 4 μm by circle equivalent diameter, and
   95% or more of the zirconia grains are in a range of 0.05 to 1 μm by circle equivalent diameter,
   on the cross section of the sintered body.
(3) The glass ceramics sintered body according to (1) or (2), wherein
   the ceramics phase further comprises silica grains, and
   an area ratio of the silica grains is 5 to 35% on the cross section of the sintered body.
(4) The glass ceramics sintered body according to (3), wherein 95% or more of the silica grains are in a range of 0.2 to 4 μm by circle equivalent diameter on the cross section of the sintered body.
(5) The glass ceramics sintered body according to any one of (1) to (4), wherein the glass phase comprises:
   5 to 14 mass % of MO, where M is an alkaline earth metal;
   3 to 20 mass % of $Al_2O_3$;
   60 to 80 mass % of $SiO_2$;
   2 to 12 mass % of $B_2O_3$; and
   2 mass % or less of $ZrO_2$.
(6) The glass ceramics sintered body according to any one of (1) to (5), wherein MO comprises CaO and SrO.
(7) A coil element comprising the glass ceramics sintered body according to any one of (1) to (6).
(8) A coil electronic component comprising a ceramics layer made of the glass ceramic sintered body according to any one of (1) to (6).
(9) An electronic component formed by laminating a coil conductor and a ceramics layer, wherein
   the coil conductor comprises Ag, and
   the ceramics layer is made of the glass ceramics sintered body according to any one of (1) to (6).

The present invention provides a glass ceramics sintered body having a low dielectric constant and a sufficient strength even at a low sintering temperature despite of containing alumina and zirconia as the filler.

DETAILED DESCRIPTION OF INVENTION

Figure 1:
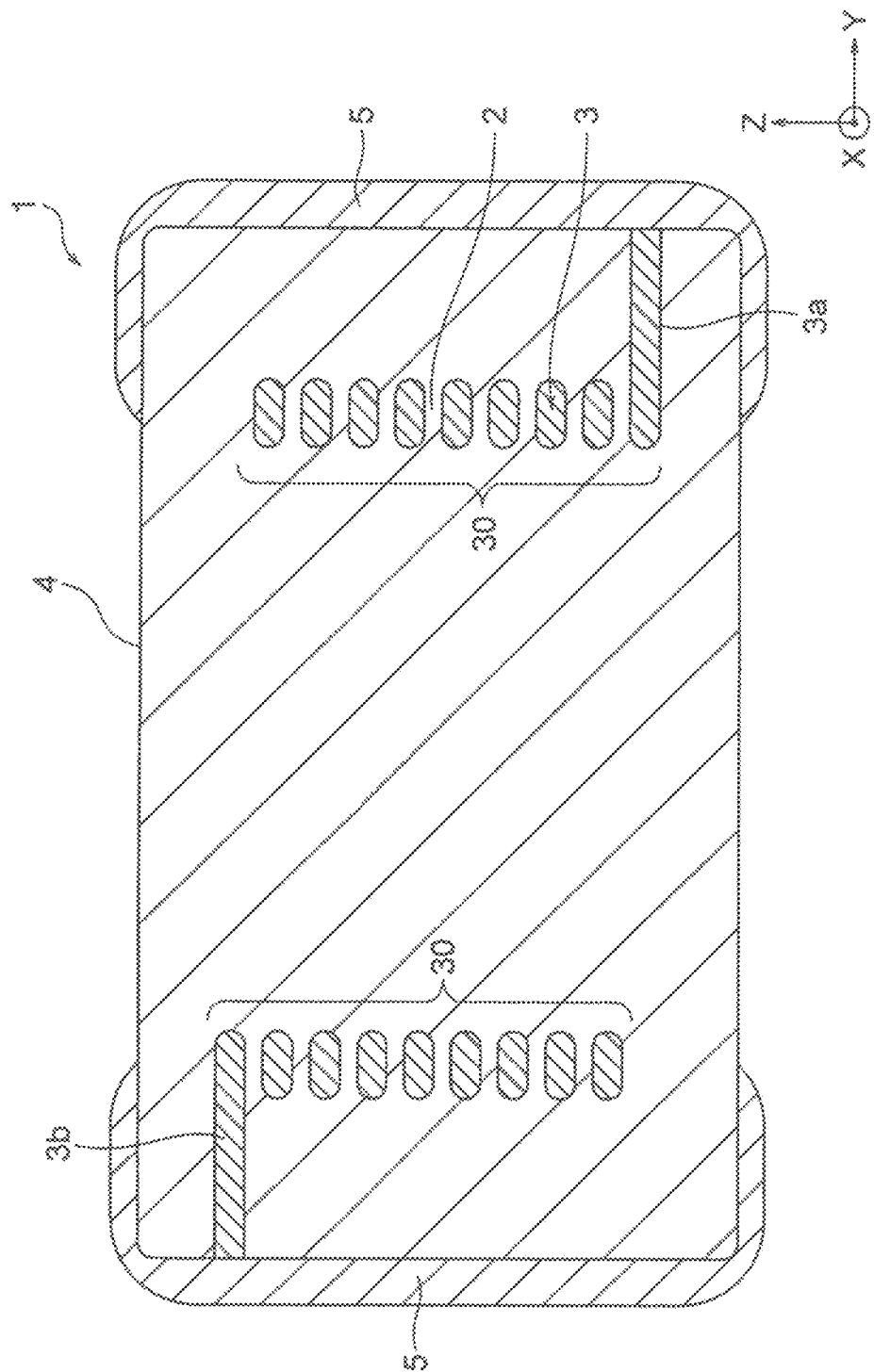
FIG. 1 is a cross-sectional view of a multilayer chip coil as a coil electronic component according to an embodiment of the present invention.

A mode (embodiment) for carrying out the present invention is described in detail with reference to the figures, but the present invention is not limited only to the embodiment described below. In addition, the constituents described below include modifications and analogues that can easily be assumed by those skilled in the art. Furthermore, the constituents described below can be combined appropriately.
(Coil Electronic Component)
FIG. 1 shows a multilayer chip coil 1 as an example of a coil electronic component according to an embodiment of the invention. The multilayer chip coil 1 has a chip element body 4. In the chip element body 4, ceramics layers 2 and internal electrode layers 3 are laminated alternately in the Z axis direction.

Each of the internal electrode layers 3 has a square ring shape, a C shape, or a U shape. The internal electrode layers 3 are connected in a spiral manner by through hole electrodes (not shown) or stepped electrodes installed for connecting the internal electrodes and penetrating the adjacent ceramics layers 2 and constitute a coil conductor 30.

Terminal electrodes 5 are respectively formed at both ends of the chip element body 4 in the Y axis direction. Ends of the extracting electrodes 3a and 3b positioned above and below in the Z-axis direction are connected to each of the terminal electrodes 5. The terminal electrodes 5 are connected to both ends of the coil conductor 30 constituting a closed magnetic circuit coil (winding pattern).

In the present embodiment, the lamination direction of the ceramics layers 2 and the internal electrode layers 3 agrees with the Z axis, the top and bottom surfaces of the terminal electrodes 5 are parallel to the XY plane, and the side surfaces of the terminal electrodes 5 are parallel to the XZ plane. The X axis, the Y axis, and the Z axis are perpendicular to each other. In the multilayer chip coil 1 shown in FIG. 1, the winding axis of the coil conductor 30 substantially agrees with the Z axis.

The chip element body 4 has any external shape and size that can appropriately be determined depending on the application. The chip element body 4 normally has an approximately rectangular-parallelepiped external shape, and for example, has a length of 0.1 to 0.8 mm in the X axis direction, a length of 0.2 to 1.6 mm in the Y axis direction, and a length of 0.1 to 1.0 mm in Z axis direction.

The ceramics layers 2 have any thickness between electrodes and any base thickness. The thickness between electrodes (a gap between the internal electrode layers 3 and 3) may be set to approximately 3 to 50 μm, and the base thickness (a distance from the extracting electrodes 3a (3b) to the end of the chip element body 4 in the Z axis direction) may be set to approximately 5 to 300 μm.

In the present embodiment, the terminal electrode 5 is not limited, and can be formed by adhering a conductive paste mainly including Ag, Pd, etc. to the outer surface of the element body 4, baking it, and then electroplating it. Cu, Ni, Sn, etc. can be used for the electroplating.

The coil conductor 30 preferably contains Ag (including an alloy of Ag) and is made of only Ag, Ag—Pd alloy, or the like. The coil conductor 30 may contain a subcomponent of Zr, Fe, Mn, Ti, and an oxides of these elements.

The ceramics layers 2 are composed of the glass ceramics sintered body according to an embodiment of the invention. Hereinafter, the glass ceramics sintered body is described in detail.
(Glass Ceramics Sintered Body)
The glass ceramics sintered body according to the present embodiment contains a glass phase having a specific composition and a ceramics phase dispersed in the glass phase. The ceramics phase contains alumina grains and zirconia grains. In the glass ceramics sintered body according to the present embodiment, the ceramics phase dispersed in the glass phase is observed on a cross section of the sintered body.

The area ratio of the alumina grains on the cross section of the sintered body is 13 to 30%, preferably more than 13% and 30% or less, more preferably 15 to 28%, and particularly preferably 17 to 26%. When the area ratio of the alumina grains is too high, the smoothness of the electrode layer is impaired, and the dielectric constant is increased. When the area ratio of the alumina grains is too low, the function as the filler may not be exhibited, and the strength may not be improved. Thus, the area ratio of the alumina grains is preferably low so as to lower the dielectric constant, and the area ratio of the alumina grains is preferably high when the improvement in strength of the sintered body is prioritized. When the improvement in strength of the sintered body is prioritized, the area ratio of the alumina grains may thereby be 26 to 30%, 28 to 30%, or 26 to 28%. To lower the dielectric constant, the area ratio of the alumina grains may be 13 to 17%, 13 to 15%, or 15 to 17%.

The area ratio of the zirconia grains on the observation surface is 0.05 to 6%, preferably 0.05 to 5%, more preferably 1 to 5%, and particularly preferably 2 to 5%. When the area ratio of the zirconia grains is too high, the dielectric constant of the sintered body increases, and it may become hard to use the sintered body in the high frequency range. When the area ratio of the zirconia grains is too low, the function as the filler is not exhibited, and the strength may not improve. Thus, when the improvement in strength of the sintered body is prioritized, the area ratio of the zirconia grains may be 5 to 6%. To lower the dielectric constant, the area ratio of the zirconia grains may be 0.05 to 2% or may be 0.05 to 1%.

The total of area ratios of the alumina grains and the zirconia grains on the observation surface are 13.05 to 36%, preferably 14 to 33%, more preferably 15 to 30%, and particularly preferably 20 to 28%. When the total of area ratios of the alumina grains and the zirconia grains is too high, the dielectric constant increases, and it may become hard to use the sintered body in the high frequency range. When the total of area ratios of the alumina grains and the zirconia grains is too low, the function as the filler is not exhibited, and the strength may not improve.

Preferably, the alumina grains on the cross section of the sintered body have a grain diameter in a predetermined range. 95% or more, preferably 98% or more, and more preferably substantially 100% of the grains are preferably in a range of 0.05 to 4 µm by circle equivalent diameter. When the grains are too small, the function as the filler is not exhibited, and the strength may not improve. When the grains are excessively large, the smoothness of the electrode layer may be impaired.

In the present embodiment, alumina is preferably α-alumina considering that alumina is hard to melt into the glass phase at a firing temperature and remains as the filler. Alumina melts at a firing temperature, and a small amount of alumina may be incorporated into the glass phase. However, alumina does not entirely melt but partially remains in the sintered body as alumina. The remaining grains can be confirmed by STEM-EDS and XRD.

Preferably, the zirconia grains on the cross section of the sintered body have a grain diameter in a predetermined range. 95% or more, preferably 98% or more, and more preferably substantially 100% of the grains are preferably in a range of 0.05 to 1 µm by circle equivalent diameter. When the grains are too small, the function as the filler is not exhibited, and the strength may not improve. When the grains are excessively large, the smoothness of the electrode layer may be impaired.

In the present embodiment, zirconia is not limited, but can be used in the form of a monoclinic zirconia, a partially stabilized zirconia (a mixed crystal of tetragonal and monoclinic crystal), a stabilized zirconia (a cubic crystal), or the like, and these may be used simultaneously as necessary. Zirconia melts at a firing temperature, and a small amount of zirconium may be incorporated into the glass phase. However, zirconia does not entirely melt but partially remains in the sintered body as zirconia. The remaining grains can be confirmed by STEM-EDS. The peak of zirconia can be observed with XRD if the area ratio is at least 1%.

Now, the "area ratio" of the grains is a ratio of cross-sectional area of specific grains to a total area of an observation visual field on a cross section, and is expressed by percentage. "Circle equivalent diameter" is a diameter of a circle whose area is the same as a projected area of the grains, and is also referred to as "Heywood diameter". The area ratio and the circle equivalent diameter are obtained from an image picture by STEM-EDS. A specific measuring method is described hereinafter.

The glass ceramics sintered body according to the present embodiment may further contain silica grains in the ceramics phase. The dielectric constant "ε" of the silica grains is 3.8. The silica grains reduce a dielectric constant of the sintered body. When the silica grains are contained excessively, however, the strength of the sintered body tends to decrease.

When the silica grains are contained, the area ratio of the silica grains on the observation surface is thereby preferably 5 to 35%, more preferably 10 to 30%, and particularly preferably 15 to 25%. When the area ratio of the silica grains is too low, the dielectric constant of the sintered body is hard to decrease. When the area ratio of the silica grains is too high, the strength may decrease.

Preferably, the silica grains on the cross section of the sintered body have a grain diameter in a predetermined range. 95% or more, preferably 98% or more, and more preferably substantially 100% of the grains are preferably in a range of 0.2 to 4 µm by circle equivalent diameter. When the grains are too small, the powder has an excessively large surface area and is thereby hard to be turned into a paint. When the grains are excessively large, the smoothness of the electrode layer may be impaired.

In the present embodiment, silica is not limited, but can be used in the form of α-quartz (crystalline silica), quartz glass (amorphous silica), or the like, and these may be used simultaneously as necessary. Silica melts at a firing temperature, and a small amount of silica may be incorporated into the glass phase. However, silica does not entirely melt but partially remains in the sintered body as silica. The remaining grains can be confirmed by STEM-EDS and XRD.

In the present embodiment, the glass phase contains a $MO$—$SiO_2$—$Al_2O_3$—$B_2O_3$ based glass. The glass phase is amorphous and exhibits a halo pattern in XRD observation. The $MO$—$SiO_2$—$Al_2O_3$—$B_2O_3$ based glass is a borosilicate glass with a low dielectric constant and can be sintered at a low temperature. Thus, this glass is especially preferable when the sintered body is applied to an inductor element. Now, "M" may be one or more selected from alkaline earth metals (Mg, Ca, Sr, and Ba), and "M" preferably includes Ca and one or more selected from Mg, Sr, and Ba, and more preferably includes Ca and Sr. Thus, MO particularly preferably includes CaO and SrO. Preferably, this glass has a glass transition point of 700 to 850° C. The glass transition point is measured by a thermomechanical analyzer (TMA).

The $MO$—$SiO_2$—$Al_2O_3$—$B_2O_3$ based glass after sintering is mainly composed of $MO$, $SiO_2$, $Al_2O_3$, and $B_2O_3$, and a part of alumina, zirconia, or silica used as the filler may be incorporated in the glass phase. Thus, the composition of the glass phase after sintering may not agree with a composition of glass grains used as a raw material.

In terms of oxide by STEM-EDS analysis described hereinafter, the preferable glass phase after sintering includes:

5 to 14 mass % (more preferably 6 to 13 mass %) of MO, where "M" is an alkaline earth metal;

3 to 20 mass % (more preferably 8 to 15 mass %) of $Al_2O_3$;

60 to 80 mass % (more preferably 65 to 75 mass %) of $SiO_2$; and 2 to 12 mass % (more preferably 3 to 8 mass %) of $B_2O_3$.

Furthermore, zirconia balls used as media when mixing the raw materials or zirconium derived from the filler zirconia may be incorporated in the glass phase.

Thus, the glass phase may include $ZrO_2$ in an amount of 2 mass % or less, preferably 1 mass % or less, in terms of oxide.

The glass phase includes $Al_2O_3$. Thus, the glass phase is strongly bonded to the alumina grains used as the filler, and contributes to improvement in strength of the sintered body.

Furthermore, the glass may include other components within a range not disturbing the effect of the present invention, and a total amount of other components in the glass is preferably 2 mass % or less. Examples of other components include $K_2O$ and $Na_2O$.

The above-mentioned MO—$SiO_2$—$Al_2O_3$—$B_2O_3$ based glass can be fired at a low temperature and can achieve a low dielectric constant and a high strength by mixture of the alumina grains and the zirconia grains. Moreover, the MO—$SiO_2$—$Al_2O_3$—$B_2O_3$ based glass may achieve a high Q Value when being turned into an electronic component.

(Manufacturing Method)

The glass ceramics sintered body of the invention is obtained by mixing a glass raw material, alumina grains, zirconia grains, and silica grains (as necessary) and sintering them.

A MO—$SiO_2$—$Al_2O_3$—$B_2O_3$ based glass prepared so that a composition after sintering satisfies the above-mentioned glass composition is used as the glass raw material. The glass raw material has any size, but D90 is preferably 1 to 5 more preferably 2 to 4 in measurement by a laser diffraction type particle size distribution meter. In manufacture of the electronic component having an internal electrode layer containing Ag, a glass raw material that can be sintered at 950° C. or less is preferably used. The glass to be applied is not limited to one kind, and a plurality of glass raw materials having different compositional ratios may be used. A glass other than the MO—$SiO_2$—$Al_2O_3$—$B_2O_3$ based glass may be used in combination as long as the sintering temperature does not rise excessively.

Preferably, the raw material alumina grains are preferably α-alumina having a high melting point. This is because the raw material alumina grains do not melt into the glass phase even after the sintering step and at least partially remain so as to form the ceramics phase. Alumina melts at a firing temperature, and a small amount of alumina may be incorporated into the glass phase. However, alumina does not entirely melt but partially remains in the sintered body as alumina. Preferably, the remaining alumina has a predetermined circle equivalent diameter on the cross section of the sintered body. Thus, D90 of the raw material alumina grains is preferably 1 to 3 more preferably 1.5 to 2 in measurement by the laser diffraction type particle size distribution meter.

The raw material zirconia grains can be used in the form of a monoclinic zirconia, a partially stabilized zirconia (a mixed crystal of tetragonal and monoclinic crystal), a stabilized zirconia (a cubic crystal), or the like, and these may be used simultaneously as necessary. Zirconia melts at a firing temperature, and a small amount of zirconium may be incorporated into the glass phase. However, zirconia does not entirely melt but partially remains in the sintered body as zirconia. Preferably, the remaining zirconia grains have a predetermined circle equivalent diameter on the cross section of the sintered body. Thus, D90 of the raw material zirconia grains is preferably 0.1 to 4 μm, more preferably 0.1 to 2 μm, in measurement by the laser diffraction type particle size distribution meter.

The raw material silica grains can be used in the form of α-quartz (crystalline silica), quartz glass (amorphous silica), or the like, and these may be used simultaneously as necessary. Silica melts at a firing temperature, and a small amount of silicon may be incorporated into the glass phase. However, silica does not entirely melt but partially remains in the sintered body as silica. Preferably, the remaining silica grains have a predetermined circle equivalent diameter on the cross section of the sintered body. Thus, D90 of the raw material silica grains is preferably 1.5 to 4 μm, more preferably 2 to 3 μm, in measurement by the laser diffraction type particle size distribution meter.

A method of manufacturing the glass ceramics sintered body of the invention is explained in more detail with reference to an example of manufacture of the multilayer chip coil 1 shown in FIG. 1.

The multilayer chip coil 1 shown in FIG. 1 can be manufactured by a normal method using the above-mentioned raw materials. That is, a glass ceramics paste obtained by kneading the above-mentioned raw material particles with a binder and a solvent is alternately printed and laminated with a conductive paste containing Ag or so and is then fired, and the chip element body 4 having the glass ceramics sintered body of the invention can be manufactured (printing method).

Alternatively, the chip element body 4 may be manufactured by preparing green sheets using the glass ceramics paste, printing an internal electrode paste on the surfaces of the green sheets, and laminating and firing them (a sheet method). In either case, after the chip element body 4 is formed, the terminal electrodes 5 should be formed by baking, plating, etc.

The glass ceramics paste contains any amount of the binder and any amount of the solvent. For example, the amount of the binder can be about 5 to 25 wt %, and the amount of the solvent can be about 30 to 80 wt %. If necessary, the paste may contain 20 wt % or less of dispersant, plasticizer, dielectrics, insulator, etc. A conductor paste containing Ag or so can be manufactured in a similar manner. Firing conditions are not limited, but when the internal electrode layer contains Ag or so, the firing temperature is preferably 950° C. or less, more preferably 920° C. or less. The firing time is not limited, but when the firing is carried out at a high temperature for a long time, alumina, zirconia, and silica used as fillers may melt and be incorporated into the glass phase. Thus, the firing time is preferably about 0.5 to 10 hours, more preferably about 1 to 5 hours, although it depends on the firing temperature.

In the glass ceramics sintered body of the embodiment, alumina and zirconia are used simultaneously as filler, and it is thereby possible to lower the dielectric constant without excessively increasing the filler amount and to improve strength and sinterability in a balanced manner. Furthermore, alumina and zirconia have a high wettability for the glass phase, and the glass ceramics sintered body having a sufficient strength can thereby be obtained even if the filler amount is reduced. Since the filler amount can be reduced, the interface between the sintered body and the internal electrode can be smoothed, and the Q value of the high frequency inductor can also be expected to improve. Furthermore, since a sufficient strength can be secured by alumina and zirconia, a relatively large amount of silica, which has a low dielectric constant, can be mixed, and the dielectric constant of the sintered body can further be reduced. According to the glass raw material and the filler raw material of the preferred embodiment, it is possible to obtain a glass ceramics sintered body exhibiting a high sinterability and having a sufficient density even if the sintering is carried out at a low temperature of preferably about 840 to 950° C., more preferably about 870 to 950° C. Thus, the glass ceramics sintered body of the embodiment can favorably be used as a ceramics layer of coil electronic components required to be sintered at a low temperature, such as a multilayer chip coil whose conductor is Ag.

The present invention is not limited to the above-described embodiment, and can variously be modified within the scope of the present invention.

The glass ceramics sintered body according to the present embodiment can also be used as a coil element of a semiconductor device. The coil element according to the present invention includes, for example, a coil component where the glass ceramics sintered body according to the present invention is thinned and incorporated in a substrate of a semiconductor device.

Furthermore, the glass ceramics sintered body according to the present embodiment can favorably be used as an interlayer material for high frequency coils.

The glass ceramics sintered body according to the present embodiment has a low dielectric constant and a sufficient strength and is thereby particularly favorable as an interlayer material constituting the ceramics layers 2 between the internal electrode layers 3 and 3.

The glass ceramics sintered body of the present embodiment can improve dielectric constant, strength, and sinterability in a balanced manner, smoothen the sintered body after firing and the internal electrode interface, obtain a smooth internal electrode layer with little unevenness, and achieve a high Q value in the high frequency region as the entire coil electronic part. The glass ceramics sintered body of the present embodiment is particularly suitable as a high frequency coil used particularly in a frequency region of one GHz or more.

In the above-mentioned embodiment, the ceramics layers 2 of the coil electronic component 1 are formed with the same material, but are not necessarily formed with the same material. As described above, the glass ceramics composition of the embodiment is particularly suitable as an interlayer material constituting the ceramics layers 2 between the internal electrode layers 3 and 3. The ceramics layers 2 that are not in contact with the coil conductor 30 may be composed of other ceramic materials.

EXAMPLES

Hereinafter, the present invention is described based on more detailed examples, but the present invention is not limited thereto.

CaO—SrO—$SiO_2$—$Al_2O_3$—$B_2O_3$ based glasses (Sample No. 1 to 20) and a CaO—BaO—$SiO_2$—$Al_2O_3$—$B_2O_3$ based glass (Sample No. 21) having the compositions shown in Table 1 were prepared as glass raw materials. Alumina grains (D90: 1.5 zirconia grains (D90: 0.8 μm), and amorphous silica (D90: 3 μm) were prepared as filler raw materials. Then, each of the glass raw materials and the filler raw materials was weighed.

Next, the preliminarily weighed raw materials were wet mixed with a solvent (99% methanol denatured ethanol) using a ball mill (media: zirconia balls) for 24 hours to obtain a raw material slurry. This raw material slurry was dried by a dryer until the solvent disappeared, and a glass ceramics material was obtained.

Next, 100 parts by weight of the obtained glass ceramics material were added with 2.5 parts by weight of an acrylic resin based binder (Elvacite manufactured by Du Pont) as a binder, granulated, and sized by a 20 mesh sieve to obtain granules. The granules were pressure-molded at 74 MPa (0.75 ton/$cm^2$) to obtain a molded body having a 17φ disc shape (diameter: 17 mm, thickness: 8.5 mm). Subsequently, the obtained molded body was fired in an air at 900° C. for two hours, and a sintered body was obtained.

Next, various characteristics were evaluated on the obtained sintered body under the following conditions. The results are shown in Table 1.

[Area Ratio and Circle Equivalent Diameter]

Area ratios and circle equivalent diameters of alumina grains, zirconia grains, and amorphous silica dispersed in the glass phase of the sintered body were measured by STEM-EDS in the following procedures.

1. Image Analysis Software and Image Analysis Method

The area ratios of alumina grains, zirconia grains, and amorphous silica contained in the sintered body were calculated by obtaining an area of each of the grains to a visual field area of a mapping image by STEM-EDS using a Mac-View (image analysis software manufactured by Mountech Co., Ltd.) and then obtaining a ratio of each area. The area and the circle equivalent diameter of the grains were calculated by tracing an outer periphery of a place determined to be the grains based on the mapping image with a pen.

2. Separation of Glass Phase, Alumina, Zirconia, and Amorphous Silica

Figure 2:
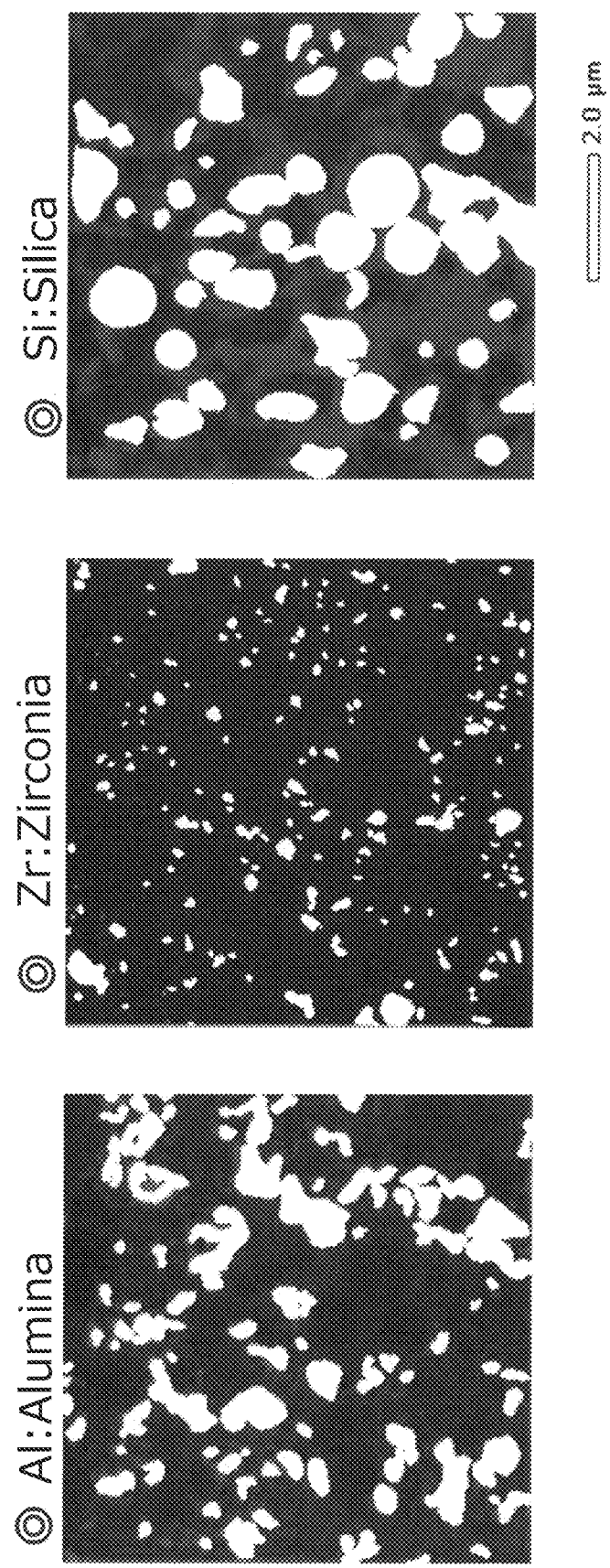
FIG. 2 is mapping images of Al, Zr, and Si by STEM-EDS for the sintered body of sample No. 4 according to the present example.

The sintered body was sampled by a FIB (Nova 200, manufactured by FEI Co.), and STEM observation and EDS analysis were performed using a STEM-EDS (JEOL-2200FS, manufactured by JEOL Ltd.) at 200 kV (acceleration voltage). Images for each element as shown in FIG. 2 were obtained by EDS mapping. In the images, a part having a high Al concentration was determined to be alumina grains, a part having a high Zr concentration was determined to be zirconia grains, and a part having a high Si concentration was determined to be amorphous silica.

Figure 3:
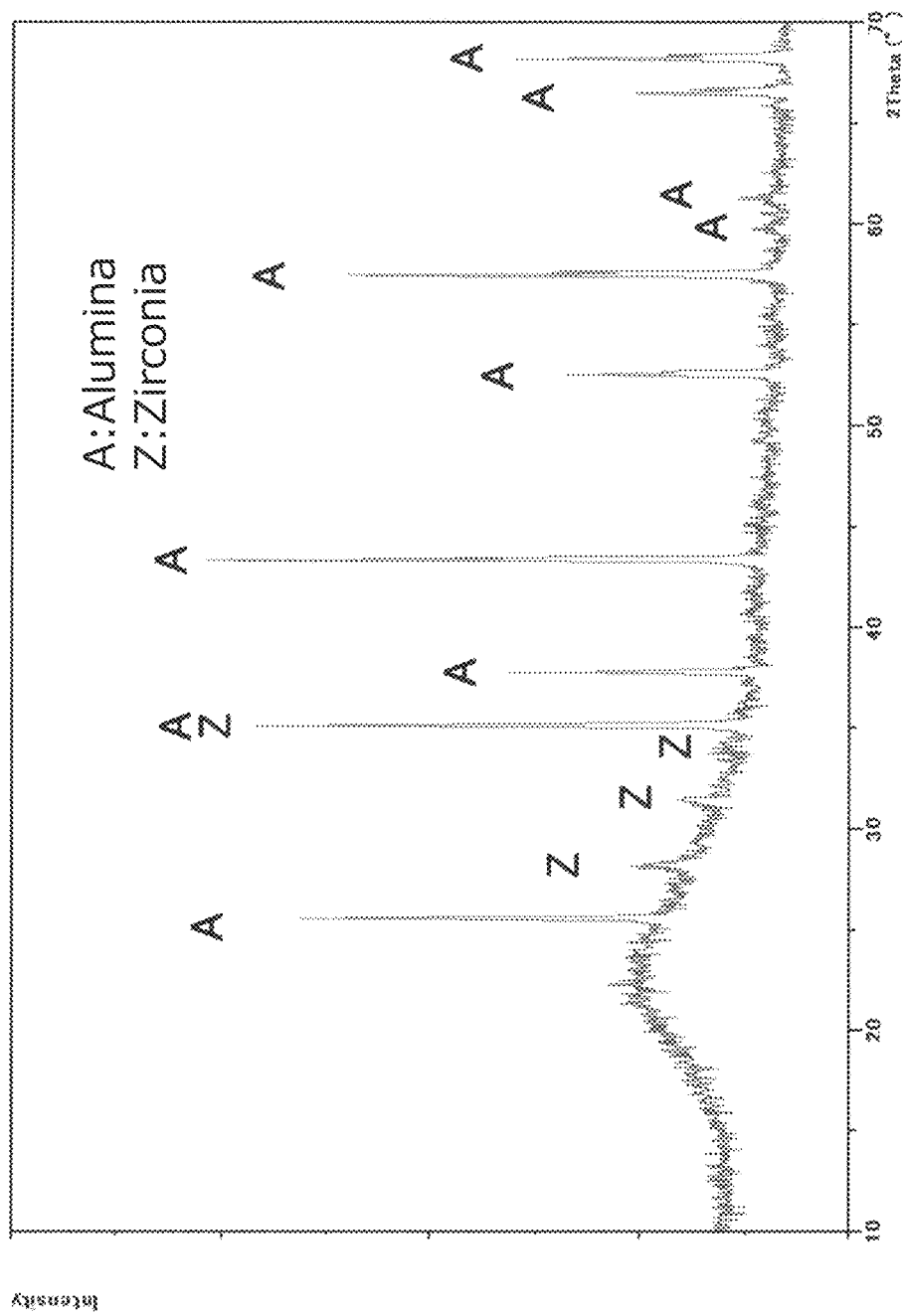
FIG. 3 is an XRD result for the sintered body of sample No. 4 according to the present example.

The sintered body was measured under the conditions of X-ray output at 45 kV and 40 mA using an XRD (X'PertPro manufactured by PANalytical Co.), and it was confirmed that the crystal phase was made only of α-alumina and monoclinic zirconia as shown in FIG. 3. An amorphous halo pattern can also be confirmed, which shows that the sintered body except for α-alumina and monoclinic zirconia is made of the glass phase. When the silica raw material was the quartz glass (amorphous silica), a halo pattern identical to that of the glass phase was confirmed. However, this halo pattern was observed largely compared to the area ratio of the amorphous silica, and a non-crystal phase derived from the amorphous silica and the raw material glass is presumed to exist. It was thereby confirmed that the sintered body of the present invention has a structure where alumina, zirconia, and amorphous silica are diffused in the CaO—SrO—$SiO_2$—$Al_2O_3$—$B_2O_3$ based glass phase.

Three visual fields were analyzed for one sample. An average value of each grain was calculated and respectively determined as an area ratio of alumina grains, zirconia grains, and amorphous silica.

[Glass Phase Composition]

In the EDS mapping, it was confirmed that an alkaline earth metal was continuously present in the region other than alumina, zirconia, and amorphous silica and was determined to be a phase whose composition was $CaO$—$SrO$—$SiO_2$—$Al_2O_3$—$B_2O_3$. When using the XRD, crystal peaks other than alumina and zirconia were not confirmed, and only halo patterns derived from the amorphous phase existed. It was thereby judged that this region was not crystallized and formed a $CaO$—$SrO$—$SiO_2$—$Al_2O_3$—$B_2O_3$ based glass phase. To determine the composition of the glass phase, five different points in the glass phase were analyzed, and their average value was obtained.

[Sinterability]

Sinterability of the glass ceramics material was evaluated by observing a fracture surface of the sintered body using an FE-SEM. A sample having few pores and a sufficiently advanced densification was evaluated as being good, and a sample having an insufficient densification was evaluated as being bad.

[Relative Dielectric Constant]

Relative dielectric constant (no unit) was measured by the resonance method (JIS R 1627) using a network analyzer (PNA N5222A manufactured by Agilent Technologies). In the example, a sample having a relative dielectric constant of less than 5.7 was evaluated as being good.

[Insulation Resistance]

Insulation resistance (unit: $\Omega \cdot m$) was calculated from size and DC resistance value measured after an In—Ga electrode was applied on both surfaces of the obtained sintered body. The measurement was carried out under the conditions of 25V for 30 seconds using an insulation resistance meter (4329A manufactured by HEWLETT PACKARD). In the example, a sample having $1 \times 10^7$ $\Omega \cdot m$ or more was evaluated as being good.

[Bending Strength]

Bending strength of the sintered body was measured by a three-point bending test (distance between points: 15 mm) using a universal material tester 5543 manufactured by INSTRON Co., Ltd. In the example, a sample having a bending strength of 150 MPa or more was evaluated as being good.

In the table, sample numbers marked with "*" indicate comparative examples. From the results of STEM-EDS, on the cross section of the sintered body, it was confirmed that 95% or more of the alumina grains showed a circle equivalent diameter of 0.05 to 4 µm, 95% or more of the zirconia grains showed a circle equivalent diameter of 0.05 to 1 µm, and 95% or more of the amorphous silica showed a circle equivalent diameter of 0.2 to 4 µm. In addition, the area ratio of the amorphous silica was 5 to 35% in any sample.

From the above results, it is understood that the glass ceramics sintered body according to the present invention achieved both a low dielectric constant and a high bending strength. When no zirconia grains were mixed (Sample 9), the dielectric constant was low, but the bending strength was low. When a small amount of zirconia grains was added, the bending strength improved (Samples 4, 6, 10, and 11). As the mixing amount of alumina grains and zirconia grains increased, both bending strength and dielectric constant increased. When alumina grains were mixed excessively (Samples 7 and 8), the bending strength became high, but the dielectric constant rose excessively. To achieve an appropriate dielectric constant, the upper limit of the mixing amount of alumina grains was about 30% by area ratio. The upper limit of improvement in bending strength by mixing zirconia grains was about 6% by area ratio (Sample 12 and Sample 13).

DESCRIPTION OF THE REFERENCE NUMERICAL

1 . . . multilayer chip coil
2 . . . ceramics layer
3 . . . internal electrode layer
3a, 3b . . . extracting electrodes
30 . . . coil conductor
4 . . . chip element body
5 . . . terminal electrode

What is claimed is:

1. A glass ceramics sintered body comprising a glass phase and a ceramics phase dispersed in the glass phase, wherein:

TABLE 1

| Sample No. | Comparative Example | Glass Phase Composition (wt %, 100 wt % in total) | | | | | | | | Area Ratio of Image analysis (%) | | Sinterability | Relative Dielectric Constant | Bending Strength (MPa) | Insulation Resistance ($\Omega \cdot m$) |
|---|---|---|---|---|---|---|---|---|---|---|---|---|---|---|---|
| | | $B_2O_3$ | $Al_2O_3$ | $SiO_2$ | CaO | SrO | BaO | $ZrO_2$ | Others | Alumina | Zirconia | | | | |
| 1 | * | 6.1 | 8.1 | 73.5 | 2.7 | 6.0 | 0.0 | 2.2 | 1.4 | 12 | 6 | Good | 5.32 | 145 | 1.6E+12 |
| 2 | | 5.8 | 9.3 | 74.9 | 2.5 | 5.9 | 0.0 | 0.3 | 1.3 | 13 | 2 | Good | 5.34 | 161 | 3.3E+11 |
| 3 | | 5.8 | 11.8 | 71.8 | 2.5 | 6.8 | 0.0 | 0.1 | 1.2 | 18 | 2 | Good | 5.39 | 166 | 5.8E+11 |
| 4 | | 5.8 | 13.2 | 70.4 | 2.5 | 6.7 | 0.0 | 0.1 | 1.3 | 24 | 2 | Good | 5.45 | 168 | 6.6E+11 |
| 5 | | 5.7 | 13.0 | 70.3 | 2.4 | 6.9 | 0.0 | 0.3 | 1.4 | 28 | 2 | Good | 5.59 | 172 | 5.4E+11 |
| 6 | | 5.8 | 13.4 | 69.7 | 2.5 | 7.0 | 0.0 | 0.2 | 1.4 | 30 | 2 | Good | 5.65 | 171 | 5.1E+11 |
| 7 | * | 6.0 | 13.5 | 69.4 | 2.6 | 6.8 | 0.0 | 0.4 | 1.3 | 32 | 2 | Good | 5.70 | 177 | 5.7E+11 |
| 8 | * | 5.7 | 13.7 | 69.4 | 2.6 | 6.9 | 0.0 | 0.5 | 1.2 | 35 | 2 | Good | 5.77 | 181 | 6.1E+11 |
| 9 | * | 5.9 | 13.7 | 69.4 | 2.7 | 7.0 | 0.0 | 0.1 | 1.2 | 24 | 0 | Good | 5.34 | 143 | 1.6E+11 |
| 10 | | 5.9 | 13.7 | 69.3 | 2.7 | 7.0 | 0.0 | 0.1 | 1.3 | 24 | 0.05 | Good | 5.34 | 159 | 5.4E+11 |
| 11 | | 6.0 | 13.0 | 69.3 | 2.6 | 6.9 | 0.0 | 0.8 | 1.4 | 24 | 4 | Good | 5.36 | 165 | 3.9E+12 |
| 12 | | 6.1 | 13.1 | 68.2 | 2.5 | 7.0 | 0.0 | 1.7 | 1.4 | 24 | 6 | Good | 5.37 | 168 | 5.9E+12 |
| 13 | | 6.0 | 13.3 | 68.1 | 2.6 | 7.1 | 0.0 | 1.6 | 1.3 | 30 | 6 | Good | 5.68 | 167 | 6.2E+12 |
| 14 | | 2.0 | 13.0 | 71.1 | 3.9 | 8.1 | 0.0 | 0.6 | 1.3 | 24 | 2 | Good | 5.49 | 170 | 6.3E+11 |
| 15 | | 11.8 | 13.0 | 67.5 | 3.8 | 2.0 | 0.0 | 0.7 | 1.2 | 24 | 2 | Good | 5.42 | 162 | 3.7E+11 |
| 16 | | 5.9 | 3.2 | 79.7 | 2.6 | 6.6 | 0.0 | 0.6 | 1.4 | 24 | 2 | Good | 5.32 | 154 | 4.1E+11 |
| 17 | | 6.2 | 19.6 | 60.3 | 3.8 | 8.6 | 0.0 | 0.6 | 1.1 | 24 | 2 | Good | 5.47 | 169 | 5.1E+11 |
| 18 | | 7.5 | 12.8 | 72.8 | 2.6 | 2.5 | 0.0 | 0.5 | 1.3 | 24 | 2 | Good | 5.41 | 158 | 8.5E+10 |
| 19 | | 5.5 | 13.6 | 65.2 | 5.7 | 8.2 | 0.0 | 0.7 | 1.1 | 24 | 2 | Good | 5.49 | 170 | 6.5E+12 |
| 20 | | 2.5 | 12.2 | 78.0 | 2.1 | 3.2 | 0.0 | 0.8 | 1.2 | 24 | 2 | Good | 5.40 | 162 | 2.3E+12 |
| 21 | | 2.4 | 10.2 | 73.7 | 3.9 | 0.0 | 8.0 | 0.5 | 1.3 | 24 | 2 | Good | 5.47 | 164 | 3.4E+11 | the ceramics phase comprises alumina grains and zirconia grains, the glass phase comprises an $MO$—$Al_2O_3$—$SiO_2$—$B_2O_3$ based glass comprising:
- 5 to 14 mass % of MO, where M is an alkaline earth metal,
- 3 to 20 mass % of $Al_2O_3$,
- 60 to 80 mass % of $SiO_2$,
- 2 to 12 mass % of $B_2O_3$, and
- 2 mass % or less of $ZrO_2$, and an area ratio of the alumina grains is 13 to 30% and an area ratio of the zirconia grains is 0.05 to 6% on a cross section of the sintered body.

2. The glass ceramics sintered body according to claim 1, wherein 95% or more of the alumina grains are in a range of 0.05 to 4 μm by circle equivalent diameter, and 95% or more of the zirconia grains are in a range of 0.05 to 1 μm by circle equivalent diameter, on the cross section of the sintered body.

3. The glass ceramics sintered body according to claim 1, wherein the ceramics phase further comprises silica grains, and an area ratio of the silica grains is 5 to 35% on the cross section of the sintered body.

4. The glass ceramics sintered body according to claim 3, wherein 95% or more of the silica grains are in a range of 0.2 to 4 μm by circle equivalent diameter on the cross section of the sintered body.

5. The glass ceramics sintered body according to claim 1, wherein MO comprises CaO and SrO.

6. A coil element comprising the glass ceramics sintered body according to claim 1.

7. A coil electronic component comprising a ceramics layer made of the glass ceramic sintered body according to claim 1.

8. An electronic component formed by laminating a coil conductor and a ceramics layer, wherein the coil conductor comprises Ag, and the ceramics layer is made of the glass ceramics sintered body according to claim 1.

* * * * *